Nov. 28, 1950   H. R. STAGNER   2,531,650
SPRAYING DEVICE

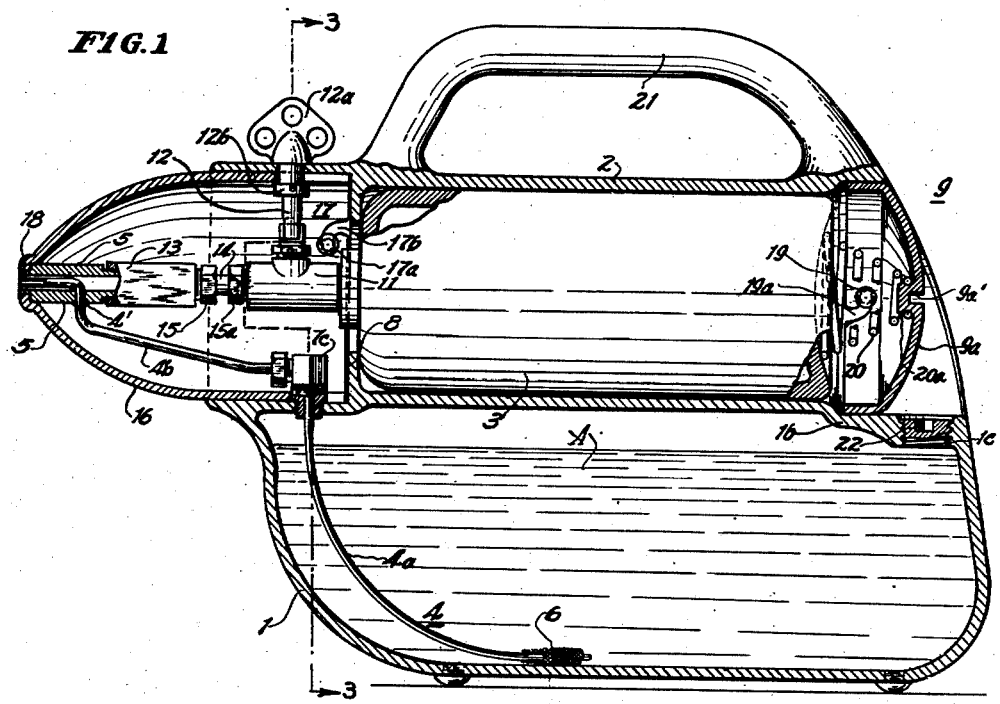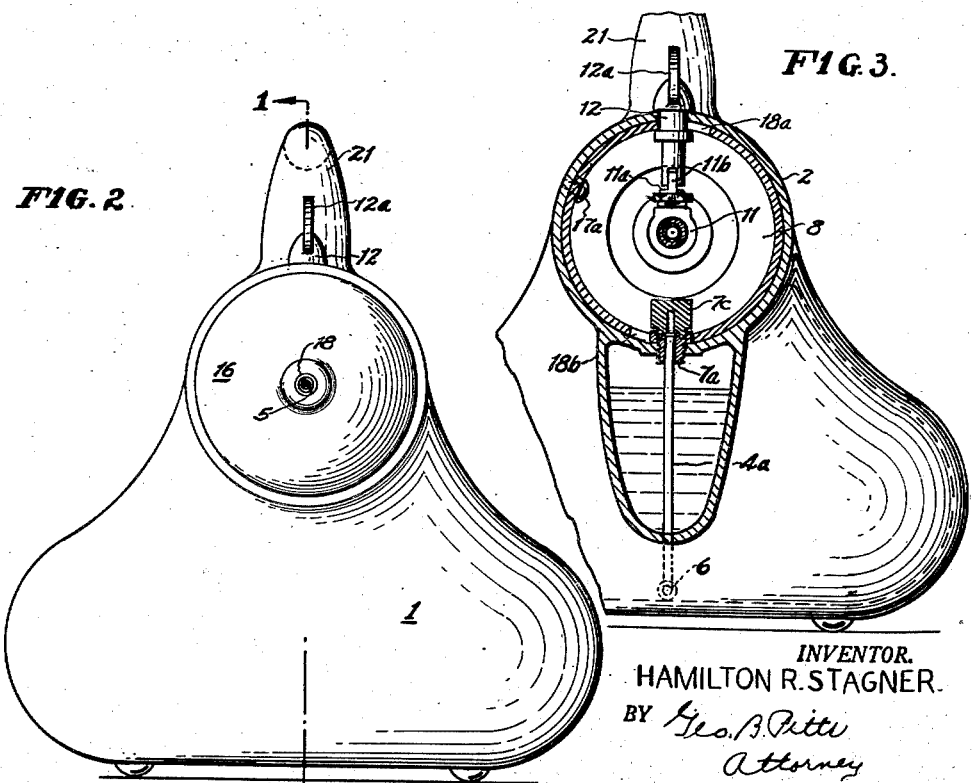

Filed Jan. 23, 1946   2 Sheets-Sheet 2

INVENTOR.
HAMILTON R. STAGNER.
BY Geo. B. Pittle
Attorney

Patented Nov. 28, 1950

2,531,650

UNITED STATES PATENT OFFICE 2,531,650

SPRAYING DEVICE

Hamilton R. Stagner, Cleveland, Ohio

Application January 23, 1946, Serial No. 642,796

5 Claims. (Cl. 299—86)

This invention relates to a device for spraying liquid on and/or over surfaces, various articles and materials, more particularly a spraying device of the portable unitary type.

One object of the invention is to provide an improved spraying device consisting of a container for the liquid to be sprayed, a spraying nozzle having a liquid connection with the container and means connected to the nozzle for continuously supplying a gaseous medium under pressure thereto.

Another object of the invention is to provide an improved spraying device consisting of a container for the liquid to be sprayed, a spraying nozzle having a liquid connection with the container, means connected to the nozzle for supplying a gaseous medium under pressure thereto, and means for controlling the supply of the gaseous medium.

Another object of the invention is to provide an improved device of this character, containing the liquid to be sprayed and adapted to removably support a cylinder charged with a gaseous medium under pressure, of simple compact construction, whereby it may be carried from place to place and readily operated to spray the liquid.

Another object of the invention is to provide an improved device of this character consisting of a casing shaped to form a container for the liquid to be sprayed and a compartment for enclosing a cylinder charged with a gaseous medium under pressure and having a fitting, through which the medium is discharged, removably connected to the spraying nozzle, the cylinder being readily replaceable.

Another object of the invention is to provide an improved device of this character consisting of a casing and a spraying nozzle, the casing being shaped to form a container for the liquid to be sprayed and a compartment removably supporting a cylinder charged with a gaseous medium under pressure.

Another object of the invention is to provide an improved spraying device consisting of a casing having a container for the liquid to be sprayed, a spraying nozzle and a conduit leading from said container to said nozzle, a compartment or receiver for a cylinder charged with a gaseous medium under pressure and adapted to be removably connected to said nozzle, and a removable enclosure for said nozzle arranged to permit access to said conduit.

Other objects of the invention will be apparent to those skilled in the art to which my invention relates from the following description taken in connection with the accompanying drawings, wherein Fig. 1 is a sectional view on the line 1—1 of Fig. 2, of a spraying device embodying my invention.

Fig. 2 is an elevational view looking toward the right of Fig. 1.

Fig. 3 is a section on the line 3—3 of Fig. 1.

Figure 5:
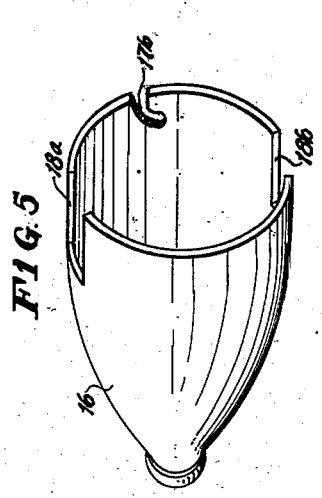
Fig. 5 is a perspective view of the enclosure for the nozzle.
Figure 6:
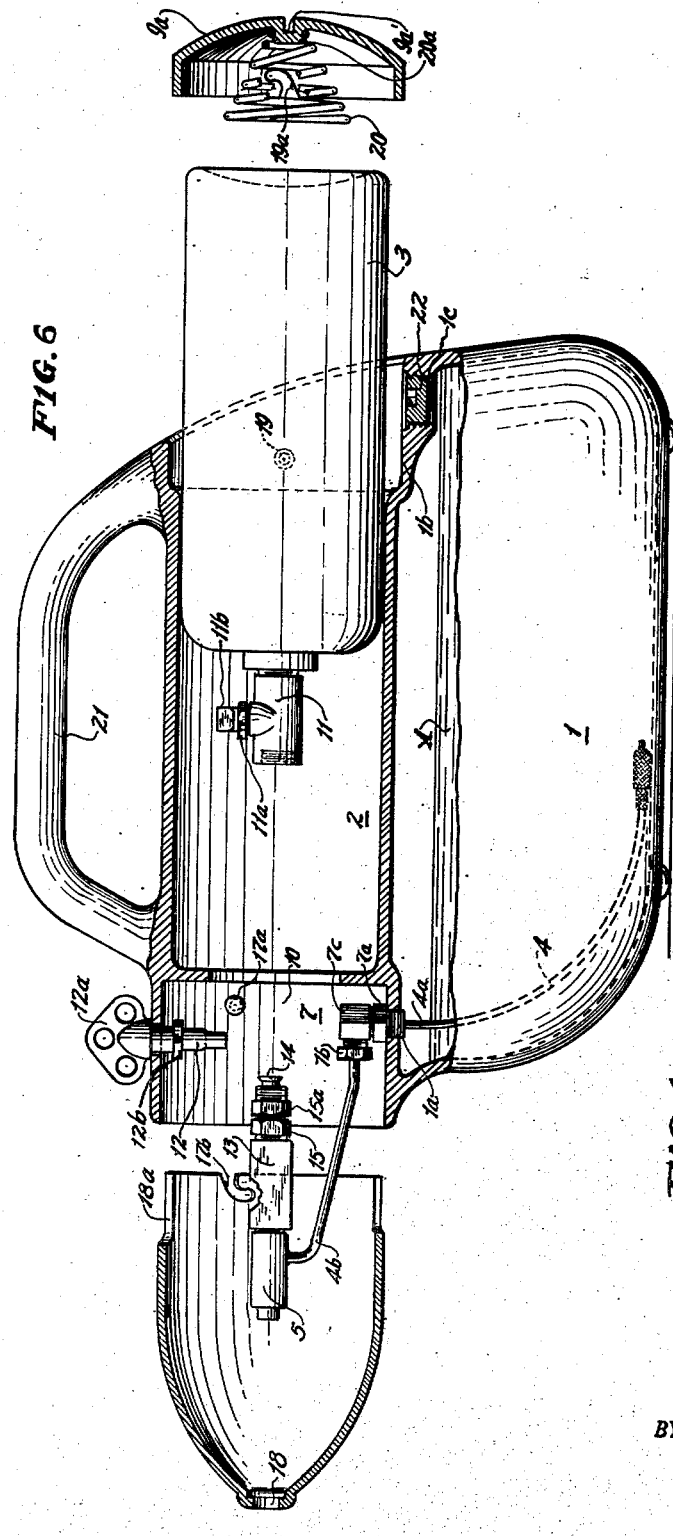
Fig. 6 is a view similar to Fig. 1, but showing parts separated.
Figure 4:
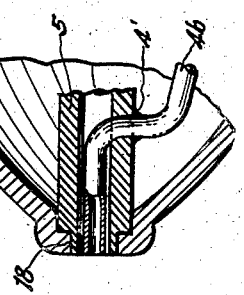
Fig. 4 is a fragmentary section of parts shown in Fig. 1, enlarged.

In the drawings, 1 indicates a container for the liquid to be sprayed, such as a suitable insecticide A. 2 indicates a compartment in which is located means for effecting spraying or siphoning of the liquid, these means, dependent on the operation of a manually operated member, operating to automatically and continuously supply a gaseous medium under pressure direct to the spraying nozzle. In the herein disclosed form of construction, the compartment 2 is elongated and preferably of annular shape in cross section, for removably supporting a cylinder 3 which is charged with a gaseous medium under pressure, of a non-inflammable character, such as carbon dioxide ($CO_2$) or nitrogen (N), which is used to effect siphoning or spraying of the liquid. The side walls of the container 1 are extended laterally from end to end thereof, so that its bottom wall may serve as a wide base to prevent the spraying device from readily tipping over and the compartment 2 is preferably mounted on top and centrally of the container 1. This arrangement insures the positioning of the cylinder 3, which is relatively heavy, midway the sides of the container 1. Also, by preference, the walls of the container 1 and compartment 2 are formed integrally, in which form of construction the bottom wall of the compartment 2 serves as the top wall of the container 1. 4 indicates a conduit leading from the container 1 through the wall of the compartment 2 adjacent one end thereof and through an opening formed in the side wall of a suitable nozzle 5. The discharge end portion of the conduit 4 is disposed concentrically to the inner wall of the nozzle and terminates at the outer end of the latter (see Fig. 4). The discharge end portion of the conduit 4 is of a size to provide an annular space between it and the inner wall of the nozzle. The conduit 4 is provided at its intake end with a suitable screen 6. The conduit 4 is formed of inner and outer sections 4a, 4b, the adjacent inner ends of which are connected together by a fitting, indicated as an entirety at 7, whereby the conduit may be removably mounted in the wall of the compartment 2 and thus permit its removal from the container 1. The fitting 7 preferably consists of an inner element 7a into and through which the inner end of the inner conduit section 4a extends, an outer element 7b into and through which the inner end of the outer conduit section 4b extends and an intermediate element 7c formed with a through opening to form a liquid connection between the conduit sections 4a, 4b. The lower end portion of the element 7a is externally threaded and threaded into an opening 1a formed in the bottom wall of the compartment 2 and serves to removably support the fitting and conduit sections 4a, 4b, on this wall. The inner wall of the element 7a is provided with screw threads to receive the annular externally threaded wall on the lower side of the intermediate element 7c, these elements 7a, 7c, when tightened together serving to clamp the flange on the inner end of the conduit section 4a between them and hence rigidly secure the conduit section thereto. The outlet for the opening through the intermediate fitting 7c is internally threaded to receive the externally threaded inner end of the fitting element 7b, so that when the latter is tightened it clamps the flange on the inner end of the conduit section 4b between it and the inner wall of the opening through the intermediate element 7c to rigidly secure these parts together. By preference, the conduit section 4b is soldered to the nozzle 5, as shown at 4', whereby the nozzle 5 and conduit 4b form a complete assembly.

8 indicates an annular wall formed integrally with the inner wall of the compartment 2 inwardly of the fitting 7 and arranged to form a seat for the inner end wall of the cylinder 3, and accommodate a discharge fitting on the inner end wall of the cylinder 3 and extending therefrom for connection with the nozzle 5. The cylinder 3 is held against the wall 8 by securing means, indicated as an entirety at 9, later referred to.

The fitting 11 is provided with a valve, the shank 11a therefor extending laterally. The outer end of the shank 11a terminates in a flat diametrically disposed lug 11b adapted to removably fit the bifurcations on the lower end of a valve operating member 12, which is rotatably mounted in and extends through the compartment wall forming the space 10, whereby its outer end may be employed to open and close the valve in the fitting 11. The valve operating member 12 is mounted in a predetermined relation to the wall 8, so that when the cylinder 3 is positioned in the compartment 2 against the wall 8, the lug 11b on the valve shank 11a will be operatively connected to the valve operating member 12. The outer end of the valve operating member 12 is provided with a wing 12a alined with the bifurcations provided on its lower end, whereby the operative may be guided in positioning the bifurcations on its lower end to receive the lug 11b. The shank of the operating member 12 is provided with a collar 12b, which is pinned to the shank, to prevent removal thereof. The inner end of the nozzle 5 may be detachably connected to the discharge end of the discharge fitting 11, but due to the high pressure of the gaseous medium in the cylinder 3 (in using nitrogen as a siphoning means the pressure in the cylinder 3 approximates 2000 lbs. per square inch), I interpose a suitable pressure reducing valve 13 between the discharge fitting 11 and the nozzle 5, which valve reduces the pressure to approximately 100 pounds. The outer end of the valve 13 is threaded into the inner end of the nozzle 5. The inner end of the valve 13 is connected to the outer end of the discharge fitting 11 by a section of tubing 14, the opposite ends of which are flanged. The flanges are engaged by coupling elements 15, 15a, which are threaded into the inner walls of the valve and fitting to clamp the flanges thereto.

16 indicates an enclosure for the nozzle 5, valve 13 and discharge fitting 11. The inner end portion of the enclosure telescopically fits within the compartment wall 2 outwardly of the wall 8 and is detachably secured thereto by means indicated as an entirety at 17. The outer end portion of the enclosure is preferably of substantially parabola shape, its outer end being formed with an opening 18 for the outer end of the nozzle 5. By preference, the inner wall of the opening 18 is annularly recessed to form a seat for the reduced end of the nozzle 5. The securing means 17 consists of a pin 17a provided on the inner wall of the compartment 2 outwardly of the wall 8 and a slot 17b formed in the wall of the enclosure and extending inwardly from its inner end, so that by telescopically sliding the enclosure 16 into the compartment 2 and then rotating it, the walls of the recess 17b will be locked by the pin 17a. The inner end of the enclosure 16 is formed with inwardly extending slots 18a, 18b, so as to accommodate the valve operating member 12 and fitting 7, respectively, and to permit rotative movement of the enclosure 16 when positioning or removing it. By removal of the enclosure 16, the nozzle 5, the valve 13, conduit 4 and coupling elements 15, 15a, are freely accessible.

The closure means 9 consist of a cup-shaped member 9a the side wall of which slidably and rotatably fits within the outer end (that end remote from the wall 8) of the compartment 2, a device for detachably securing the member 9a in the compartment 2 and an element 20 arranged to removably engage the adjacent end of the cylinder 3. The detachable devices for the member 9a consist of a pin 19 provided on the inner wall of the compartment 2 and a slot 19a formed in the side wall of the member 9a arranged to engage the pin 19 when the member is positioned in the compartment and rotated. The engaging member 20 preferably consists of a coiled spring fixed at its outer end to a boss 20a provided on the inner wall of the member 9a, the spring 20 serving to yieldably engage the cylinder 3 and maintain it against the wall 8. The outer end of the compartment wall is enlarged to form a seat for the member 9a and to accommodate the pin 19, so that the cylinder 3 may be positioned and removed without engaging the pin.

The outer wall of the member 9a is formed with an elongated recess 9a' to take a suitable tool (such as a screw driver), whereby the member may be readily removed. The seat for the closure member 9a is disposed inwardly of the outer open end of the compartment 2 to provide outwardly of the member 9a a wall 1b in which is formed a threaded opening 1c to permit filling of the container with the insecticide A, the opening being closed (liquid tight) by a removable screw plug 22.

21 indicates a suitable handle preferably formed integrally with the top wall of the compartment 2. By means of the handle 21 the device may be readily carried and positioned to spray the insecticide in various directions.

From the foregoing description it will be observed that the spraying device is unitary in providing a container for the liquid to be sprayed and a supply of a gaseous medium under pressure to effect the spraying or siphoning of the liquid, the medium supply being automatic and continuous and dependent on the operation of a manually operated member. It will also be observed that the siphoning means are independent of the liquid in the container, so the gaseous medium supplied therefrom flows directly to the spraying nozzle and does not act on the surface of the liquid in the container to force the liquid therefrom through the conduit to the spraying nozzle.

To those skilled in the art to which my invention relates many changes in construction and widely differing embodiments of the invention will be apparent without departing from the spirit and scope thereof. My disclosures and the description herein are purely illustrative and not intended to be in any sense limiting.

What I claim is:

1. In a spraying device, the combination of a casing having side walls and an intermediate wall connected to said side walls to form a closed container for the liquid to be sprayed and a compartment, a cylinder charged with a gaseous medium under pressure removably supported in said compartment and provided at its inner end with a fitting, through which the medium is discharged, means detachably engaging the wall of said compartment and the opposite end of the cylinder for securing the latter in said compartment, a nozzle, a reducing valve between and detachably connected at its opposite ends to the inner end of said nozzle and the adjacent end of said discharge fitting for the cylinder, to provide a direct flow connection for the gaseous medium from said cylinder to said nozzle, a conduit for the liquid in said container extending through the wall of said compartment and the side wall of said nozzle, the outer end of said conduit being disposed concentrically to the inner wall of said nozzle and terminating substantially of the outer end of the latter, and an enclosure for said nozzle and said valve removably connected to the adjacent wall of said compartment.

2. In a spraying device, the combination of a casing having side walls and an intermediate wall forming a container for the liquid to be sprayed and a compartment, a cylinder charged with a gaseous medium under pressure, removably supported in said compartment, the inner wall of said compartment inwardly of its inner end being provided with an annular wall forming a seat for the inner end of the cylinder, means detachably engaging the wall of said casing and the opposite end of the cylinder for securing the latter against said seat, that end of the cylinder engaging said seat being provided with a fitting, through which the medium is discharged, extending through said annular wall, a nozzle, a reducing valve connected to the inner end of said nozzle and adapted to be detachably connected to the discharge fitting for the cylinder, and a conduit for the liquid in said container extending through the wall of said compartment outwardly of said annular wall and the side wall of said nozzle, the outer end of said conduit being disposed concentrically to the inner wall of said nozzle and terminating substantially at the outer end of the latter.

3. In a spraying device, the combination of a casing having side walls and an intermediate wall forming a container for the liquid to be sprayed and an elongated compartment open from end to end and provided adjacent one open end thereof with an inner annular wall, a removable closure for the opposite open end of said compartment, a cylinder charged with a gaseous medium under pressure removably fitting the inner wall of said compartment between said annular wall and said closure and provided with a valve controlled fitting for the discharge of the gaseous medium extending through said annular wall, a valve operating member carried by the wall of said compartment outwardly of said annular wall, the valve of said fitting being arranged to be operatively and detachably connected to said member when said cylinder is positioned in said compartment, a nozzle removably connected to said fitting, a conduit leading from said container through the wall of said compartment beyond said annular wall, the outer end portion of said conduit extending through the side wall of said nozzle and its discharge end being disposed concentrically to the inner wall of said nozzle, and means detachably connected to the adjacent open end of said compartment for supporting the outer end of said nozzle.

4. In a spraying device, the combination of a casing shaped to form an elongated closed container for the liquid to be sprayed and having contiguous extended side walls cooperating with the top wall of said container to form an elongated compartment of cylindrical shape in cross section open at its opposite ends and provided adjacent one end thereof with an inner annular wall, a valve operating member mounted in the wall of said compartment outwardly of said annular wall, a conduit for the liquid extending from said container into said compartment outwardly of said annular wall, a nozzle surrounding the discharge end of said conduit, a cylinder charged with a gaseous medium under pressure removably mounted in said compartment and provided on its inner end wall with a valved controlled fitting for the discharge of the gaseous medium and extending through said annular wall and detachably connected to the inner end of said nozzle, the valve of said fitting being arranged to detachably engage said member when said cylinder is positioned in said compartment, and closure devices for the opposite open ends of said compartment, one of said devices being removably mounted on the wall of said compartment at one end thereof and supporting the outer end of said nozzle and the other device detachably mounted on the wall of said compartment at its opposite end and engaging said cylinder to seat it against said annular wall.

5. A device as claimed in claim 4 wherein the top wall of said container extends outwardly beyond said other closure device and formed with a filling opening and a closure for said opening.

HAMILTON R. STAGNER.

REFERENCES CITED

The following references are of record in the file of this patent:

UNITED STATES PATENTS

| Number | Name | Date |
| --- | --- | --- |
| 1,726,741 | Keller | Sept. 3, 1929 |
| 1,742,604 | Lemoine | Jan. 7, 1930 |
| 2,076,709 | Deutsch | Apr. 13, 1937 |
| 2,098,454 | Kelley, Jr. | Nov. 9, 1937 |
| 2,160,043 | Threm | May 30, 1939 |
| 2,182,742 | Brewer | Dec. 5, 1939 |
| 2,189,643 | Ward | Feb. 6, 1940 |
| 2,233,836 | Davidson | Mar. 4, 1941 |

FOREIGN PATENTS

| Number | Country | Date |
| --- | --- | --- |
| 684,653 | France | June 30, 1930 |